United States Patent
Kim et al.

(10) Patent No.: US 9,298,587 B2
(45) Date of Patent: Mar. 29, 2016

(54) INTEGRATED CIRCUIT INCLUDING CLOCK CONTROLLED DEBUGGING CIRCUIT AND SYSTEM-ON-CHIP INCLUDING THE SAME

(71) Applicant: SAMSUNG ELECTRONICS CO., LTD., Suwon-Si, Gyeonggi-Do (KR)

(72) Inventors: Dong-Keun Kim, Seoul (KR); Si-Young Kim, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 399 days.

(21) Appl. No.: 13/796,601

(22) Filed: Mar. 12, 2013

(65) Prior Publication Data

US 2013/0318403 A1 Nov. 28, 2013

(30) Foreign Application Priority Data

May 22, 2012 (KR) .................. 10-2012-0054010

(51) Int. Cl.
*G06F 11/00* (2006.01)
*G06F 11/36* (2006.01)

(52) U.S. Cl.
CPC ........ *G06F 11/3636* (2013.01); *G06F 11/3656* (2013.01)

(58) Field of Classification Search
USPC .......................................................... 714/34
See application file for complete search history.

(56) References Cited

U.S. PATENT DOCUMENTS

| | | | |
|---|---|---|---|
| 6,389,557 B1 | 5/2002 | Yu et al. | |
| 6,502,209 B1* | 12/2002 | Bengtsson et al. | 714/35 |
| 2002/0116081 A1 | 8/2002 | Wood et al. | |
| 2003/0070013 A1 | 4/2003 | Hansson | |
| 2006/0059388 A1 | 3/2006 | Bensinger et al. | |
| 2007/0220334 A1* | 9/2007 | Pedersen et al. | 714/30 |
| 2007/0220337 A1 | 9/2007 | Itoh et al. | |
| 2007/0226548 A1* | 9/2007 | Lai et al. | 714/52 |
| 2008/0307244 A1 | 12/2008 | Bertelsen et al. | |
| 2008/0312900 A1* | 12/2008 | Akiba et al. | 703/23 |
| 2009/0031163 A1* | 1/2009 | Rashed et al. | 714/3 |

(Continued)

FOREIGN PATENT DOCUMENTS

| | | |
|---|---|---|
| JP | 3741182 | 11/2005 |
| JP | 2006-171810 | 6/2006 |

(Continued)

OTHER PUBLICATIONS

English Abstract for Publication No. 10-2001-0038761.
English Abstract for Publication No. 10-2003-0058130.
English Abstract for Publication No. 11-282179 (FOR JP3741182).
English Abstract for Publication No. 2006-171810.
English Abstract for Publication No. 2011-081834.

*Primary Examiner* — Sarai Butler
(74) *Attorney, Agent, or Firm* — F. Chau & Associates, LLC

(57) ABSTRACT

An integrated circuit includes a processor core, a clock control circuit and a debugging circuit. The processor core processes target software. The clock control circuit determines whether an electrical connection exists between the processor core and an external debugger and generates a determination result. The clock control circuit generates an output clock signal based on the determination result. The external debugger performs a debugging operation for the target software. The output clock signal is selectively activated based on the determination result and an input clock signal. The debugging circuit provides information with respect to the debugging operation for the target software to the external debugger based on the output clock signal.

20 Claims, 11 Drawing Sheets

(56) References Cited

U.S. PATENT DOCUMENTS

2012/0110379 A1* 5/2012 Shao et al. ............... 714/15
2012/0131526 A1* 5/2012 Schreiber et al. ......... 716/110
2012/0150479 A1* 6/2012 Balkan et al. ............. 702/125

FOREIGN PATENT DOCUMENTS

| | | |
|---|---|---|
| JP | 2011-081834 | 4/2011 |
| KR | 10-2001-0038761 | 5/2001 |
| KR | 10-2003-0058130 | 7/2003 |

* cited by examiner

INTEGRATED CIRCUIT INCLUDING CLOCK CONTROLLED DEBUGGING CIRCUIT AND SYSTEM-ON-CHIP INCLUDING THE SAME

CROSS-REFERENCE TO RELATED APPLICATION

This application claims priority under 35 USC §119 to Korean Patent Application No. 10-2012-0054010, filed on May 22, 2012, in the Korean Intellectual Property Office (KIPO), the contents of which are herein incorporated by reference in their entirety.

TECHNICAL FIELD

Exemplary embodiments of the present invention relate to an integrated circuit, and more particularly to an integrated circuit including a clock controlled debugging circuit and a system-on-chip including the integrated circuit.

DISCUSSION OF THE RELATED ART

Some integrated circuits (ICs), such as an application processors (APs), microprocessors, and other ICs that execute software or programs, include debugging circuits for performing a debugging operation. In addition, various technologies have been proposed to control the debugging circuits.

SUMMARY

Exemplary embodiments of the present invention provide an integrated circuit (IC) including a debugging circuit. The IC also includes a clock control circuit for controlling a clock signal of the debugging circuit so that the debugging circuit receives a clock signal while the IC is in a debugging mode and so that the debugging circuit does not receive the clock signal when the IC is not in a debugging mode. By preventing the debugging circuit from receiving the clock signal when not in the debugging mode, power consumption is reduced.

Exemplary embodiments provide a system-on-chip including such an integrated circuit.

According to exemplary embodiments, an integrated circuit includes a processor core, a clock control circuit and a debugging circuit. The processor core processes a plurality of instructions and data that constitutes target software. The clock control circuit determines an electrical connection state between the processor core and an external debugger to generate a determination result, and the clock control circuit generates an output clock signal based on the determination result and an input clock signal. The external debugger performs a debugging operation for the target software. The output clock signal is selectively activated based on the determination result and the input clock signal. The debugging circuit provides information with respect to the debugging operation for the target software to the external debugger based on the output clock signal.

In an exemplary embodiment, the clock control circuit may activate the output clock signal by passing along the input clock signal when the processor core is electrically connected to the external debugger. The clock control circuit may inactivate the output clock signal by gating the input clock signal when the processor core is not electrically connected to the external debugger.

In an exemplary embodiment, the clock control circuit may activate the output clock signal by passing along the input clock signal when the processor core is electrically connected to the external debugger. The clock control circuit may activate the output clock signal by passing along the input clock signal based on a user-provided value or may inactivate the output clock signal by gating the input clock signal when the processor core is not electrically connected to the external debugger.

In an exemplary embodiment, the clock control signal may include a detection unit, a selection unit and a clock gating unit. The detection unit may generate a selection signal by detecting the electrical connection state between the processor core and the external debugger. The selection unit may output a clock control signal, which may include either a first signal or a second signal, based on the selection signal. The first signal may correspond to a normal operation mode, and the second signal may correspond to a debugging mode. The clock gating unit may generate the output clock signal by gating or passing along the input clock signal based on the clock control signal.

The integrated circuit may operate in the normal operating mode when the processor core is not electrically connected to the external debugger. The integrated circuit may operate in the debugging mode when the processor core is electrically connected to the external debugger.

The selection unit may output the first signal as the clock control signal in the normal operating mode and may output the second signal as the clock control signal in the debugging mode. The clock gating unit may gate or bypass the input clock signal in the normal operating mode to generate the output clock signal and may bypass the input clock signal in the debugging mode to generate the output clock signal.

In an exemplary embodiment, the selection unit may include a multiplexer. The multiplexer may include a first input terminal receiving the first signal, a second input terminal receiving the second signal, a selection terminal receiving the selection signal, and an output terminal selectively outputting the first signal or the second signal as the clock control signal in response to the selection signal.

In an exemplary embodiment, the clock gating unit may include a logic gate. The logic gate may include a first input terminal receiving the input clock signal, a second input terminal receiving the clock control signal, and an output terminal outputting the output clock signal by performing a logic operation on the input clock signal and the clock control signal.

In an exemplary embodiment, the clock gating unit may include a transistor. The transistor may include a first electrode receiving the input clock signal, a control electrode receiving the clock control signal, and a second electrode outputting the output clock signal in response to the clock control signal.

In an exemplary embodiment, the clock control circuit may further include a register unit that sets the first signal based on a user-provided input signal.

The integrated circuit may include an application processor (AP), a microprocessor and/or a central processing unit (CPU).

According to exemplary embodiments, a system-on-chip includes a plurality of functional circuits, an integrated circuit and a power management circuit. The integrated circuit drives at least one of the functional circuits by executing target software. The power management circuit provides a power supply voltage to the functional circuits and the integrated circuit. The integrated circuit includes a processor core, a clock control circuit and a debugging circuit. The processor core processes a plurality of instructions and data, which together constitute the target software. The clock control circuit determines an electrical connection state between the processor core and an external debugger to generate a determination result. The clock control circuit generates an output clock signal based on the determination result and an input clock signal. The external debugger performs a debugging operation for the target software. The output clock signal is selectively activated based on the determination result and the input clock signal. The debugging circuit provides information with respect to the debugging operation for the target software to the external debugger based on the output clock signal.

The system-on-chip may further include a socket for facilitating an electric connection with the external debugger.

The integrated circuit and the functional circuits may be included in mutually exclusive power domains.

The functional circuits may include an interface circuit, a communication circuit, and/or a multimedia circuit.

According to exemplary embodiments, the integrated circuit selectively applies clock signals to the debugging circuit or blocks the clock signals according to the electrical connection state between the processor core and the external debugger, so power consumption of the integrated circuit and the system-on-chip including the integrated circuit can be reduced when in the normal operating mode and the debugging operation for the target software can be effectively performed when in the debugging mode.

The exemplary embodiments are not limited to the above-described features. Other features may be included, as would be understood by those of ordinary skill in the art.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

Figure 1:
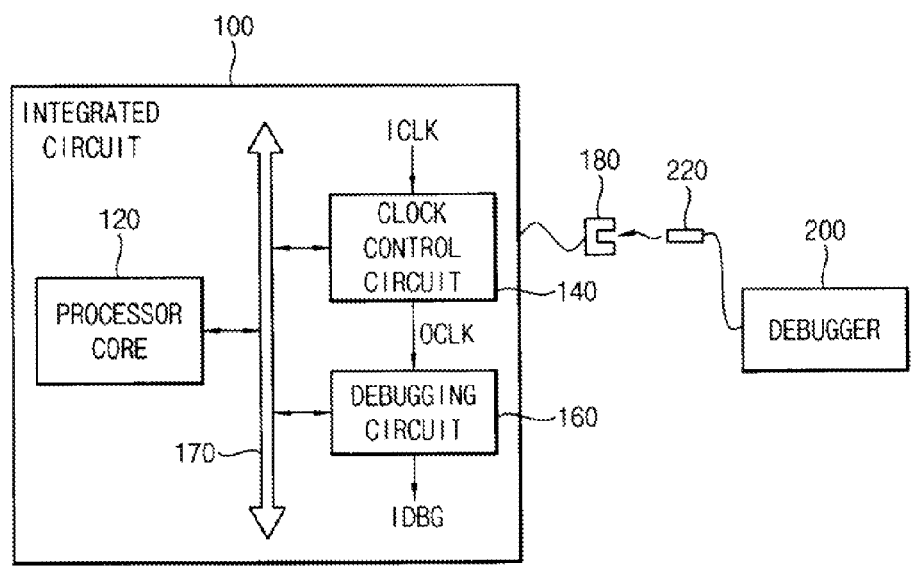
FIG. 1 is a block diagram illustrating an integrated circuit according to exemplary embodiments of the present invention.

Various exemplary embodiments will be described more fully hereinafter with reference to the accompanying drawings. The present inventive concept may, however, be embodied in many different forms and should not be construed as limited to the exemplary embodiments set forth herein.

In the drawings, the sizes and relative sizes of layers and regions may be exaggerated for clarity. Like numerals may refer to like elements throughout.

It will be understood that when an element is referred to as being "connected" or "coupled" to another element, it can be directly connected or coupled to the other element or intervening elements may be present.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, exemplary embodiments of the present invention will be described with reference to accompanying drawings. The same reference numerals may be used to refer to the same elements throughout the drawings and detailed description about the same elements may be omitted.

FIG. 1 is a block diagram illustrating an integrated circuit according to exemplary embodiments of the present invention.

Referring to FIG. 1, the integrated circuit 100 includes a processor core 120, a clock control circuit 140 and a debugging circuit 160.

The integrated circuit 100 may be an application processor (AP), a microprocessor, a central processing unit (CPU), or any other circuit for processing data and/or code. The processor core 120, the clock control circuit 140 and the debugging circuit 160 are electrically connected with each other through an internal bus 170 to perform signal communication with each other.

The processor core 120 processes a plurality of instructions and data, which together constitute target software. For example, the processor core 120 fetches the instructions and the data to process the fetched instructions and the fetched data. The target software may include software installed in the integrated circuit 100 and software developed by a user in a user environment.

The clock control circuit 140 determines an electrical connection state between the processor core 120 and an external debugger 200, which is external to the integrated circuit 100, to generate a determination result. The clock control circuit 140 generates an output clock signal OCLK based on the determination result and an input clock signal ICLK. The output clock signal OCLK is selectively activated based on the determination result and the input clock signal. The external debugger 200 is located outside the integrated circuit 100 and performs a debugging operation for the target software. For example, when a connector 220 electrically connected to the external debugger 200 is inserted into a socket 180 electrically connected to the integrated circuit 100, the external debugger 200 may be electrically connected to the processor core 120.

When the processor core 120 is not electrically connected to the external debugger 200, the integrated circuit 100 may operate in a normal operating mode to execute the target software. When the processor core 120 is electrically connected to the external debugger 200, the integrated circuit 100 may operate in a debugging mode to perform the debugging operation.

The debugging circuit 160 provides information IDBG pertaining to the debugging operation for the target software to the external debugger 200 based on the output clock signal OCLK. For example, the debugging circuit 160 may provide the information IDBG pertaining to the debugging operation for the target software to the external debugger 200 when in the debugging mode. The information IDBG may include information about the trace and breakpoint according to the execution of the target software.

According to exemplary embodiments, when the processor core 120 is electrically connected to the external debugger 200 (e.g., when in the debugging mode), the clock control circuit 140 may activate the output clock signal OCLK by passing along the input clock signal ICLK therethrough. When the processor core 120 is not electrically connected to the external debugger 200 (e.g., in the normal operating mode), the clock control circuit 140 may inactivate the output clock signal OCLK by gating the input clock signal ICLK or may activate or inactivate the output clock signal OCLK by passing along or gating the input clock signal ICLK based on a user-provided setting value.

According to exemplary embodiments of the present invention, the integrated circuit 100 may be encapsulated within a case or may be mounted on a printed circuit board (PCB). The socket 180 may be mounted on the PCB together with the integrated circuit 100 or the socket 180 may be built-in the case of the integrated circuit 100. In addition, the socket 180 can be detachably attached to the case. In addition, the external debugger 200 can be directly received by the socket 180 without the use of a connector 220.

Although not illustrated in FIG. 1, the integrated circuit 100 may further include an internal memory that stores the instructions and the data, a memory controller that controls an external memory (not shown) such that the external memory performs the reading and writing operations, and an interface circuit that communicates signals with various external devices.

In general, a debugging circuit included in an integrated circuit, such as an application processor or a microprocessor, is dedicated for the development of software or programs. For example, the debugging circuit may be used to performs the debugging operation when the error occurs during the development of software or programs. When the integrated circuit is provided to users after the development of software or program has been completed, a clock signal applied to the debugging circuit is blocked to reduce power consumption of the integrated circuit. Thus, when the user develops the target software under a user environment, it may be difficult to perform the debugging operation for target software because the clock signal applied to the debugging circuit is blocked, even if the external debugger is connected to the integrated circuit.

The integrated circuit 100 according to exemplary embodiments includes the clock control circuit 140 which selectively activates the output clock signal OCLK (e.g., selectively applies clocks to the debugging circuit 160 or blocks the clocks from reaching the debugging circuit) depending on the electrical connection state between the processor core 120 and the external debugger 200. For example, the clock control circuit 140 may provide the activated output clock signal OCLK to the debugging circuit 160 by passing along the input clock signal ICLK therethrough in the debugging mode, in which the integrated circuit 100 is electrically connected to the external debugger 200. The clock control circuit 140 may provide the inactivated output clock signal OCLK to the debugging circuit 160 by gating the input clock signal ICLK in the normal operating mode, in which the integrated circuit 100 is not electrically connected to the external debugger 200. Thus, power consumption of the integrated circuit 100 can be relatively reduced in the normal operating mode and the debugging operation for the target software can be effectively performed in the debugging mode.

Figure 2:
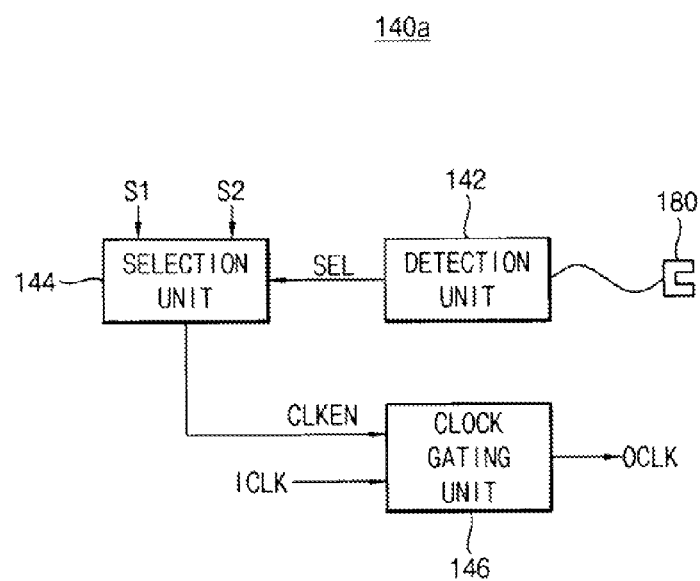
FIG. 2 is a block diagram illustrating an example of a clock control circuit included in an integrated circuit as shown in FIG. 1.

FIG. 2 is a block diagram illustrating an example of the clock control circuit included in the integrated circuit in FIG. 1.

Referring to FIGS. 1 and 2, the clock control circuit 140a may include a detection unit 142, a selection unit 144 and a clock gating unit 146.

The detection unit 142 may generate a selection signal SEL by detecting the electrical connection state between the processor core 120 and the external debugger 200. The detection unit 142 may be connected to the socket 180. The selection signal SEL may have a first logic level (e.g., a logic low level) when the external debugger 200 is not electrically connected to the processor core 120 and the selection signal SEL may have a second logic level (e.g., a logic high level) when the external debugger 200 is electrically connected to the processor core 120, for example, through the socket 180.

The selection unit 144 may output a first signal S1 or a second signal S2 as a clock control signal CLKEN based on the selection signal SEL. The first signal S1 may correspond to the normal operating mode, and the second signal S2 may correspond to the debugging mode.

Figure 3:
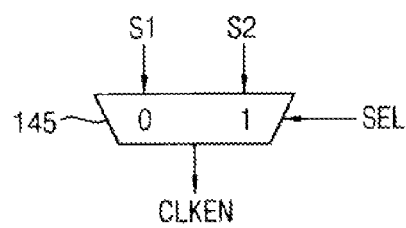
FIG. 3 is a diagram illustrating an example of a selection unit included in a clock control circuit as show in FIG. 2.

FIG. 3 is a diagram illustrating an example of the selection unit included in the clock control circuit as shown in FIG. 2.

Referring to FIG. 3, the selection unit 144 may include a multiplexer 145. The multiplexer 145 includes a first input terminal receiving the first signal S1, a second input terminal receiving the second signal S2, a selection terminal receiving the selection signal SEL and an output terminal selectively outputting the first signal S1 or the second signal S2 as the clock control signal CLKEN in response to the selection signal SEL. For example, if the selection signal SEL has the first logic level (e.g., "0"), which represents the normal operating mode, the multiplexer 145 outputs the first signal S1 as the clock control signal CLKEN. In addition, if the selection signal SEL has the second logic level (e.g., "1"), which represents the debugging mode, the multiplexer 145 outputs the second signal S2 as the clock control signal CLKEN. The first and second signals S1 and S2 may have the fixed valve, in which the first signal S1 may have the first logic level and the second signal S2 may have the second logic level.

Referring back to FIG. 2, the clock gating unit 146 may generate the output clock signal OCLK by gating or passing along the input clock signal ICLK based on the clock control signal CLKEN.

Figure 4A:
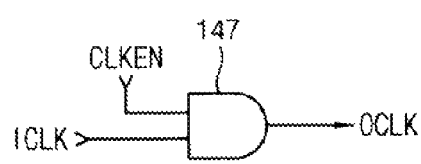
FIGS. 4A and 4B are diagrams illustrating examples of a clock gating unit included in a clock control circuit as shown in FIG. 2.
Figure 4B:
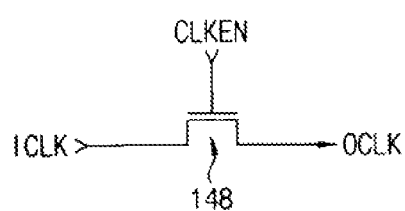

FIGS. 4A and 4B are diagrams illustrating examples of the clock gating unit included in the clock control circuit in FIG. 2.

Referring to FIG. 4A, the clock gating unit 146a may include a logic gate 147. For example, the logic gate 147 may be an AND gate. The logic gate 147 may include a first input terminal receiving the input clock signal ICLK, a second input terminal receiving the clock control signal CLKEN, and an output terminal outputting the output clock signal OCLK by performing the logic operation (e.g., AND operation) on the input clock signal ICLK and the clock control signal CLKEN. For example, when the clock control signal CLKEN corresponds to the first signal S1 (e.g., in the normal operating mode), the logic gate 147 may output the inactivated output clock signal OCLK having the logic low level. In addition, when the clock control signal CLKEN corresponds to the second signal S2 (e.g., in the debugging mode), the logic gate 147 may output the activated output clock signal OCLK, which is toggled substantially identical to the input clock signal ICLK.

Referring to FIG. 4B, the clock gating unit 146b may include a transistor 148. For example, the transistor 148 may be an NMOS transistor. The transistor 148 may include a first electrode (e.g., a drain electrode) receiving the input clock signal ICLK, a control electrode (e.g., a gate electrode) receiving the clock control signal CLKEN, and a second electrode (e.g., a source electrode) outputting the output clock signal OCLK in response to the clock control signal CLKEN. For example, when the clock control signal CLKEN corresponds to the first signal S1 (e.g., in the normal operating mode), the transistor 148 may output the inactivated output clock signal OCLK having the logic low level by gating the input clock signal ICLK. In addition, when the clock control signal CLKEN corresponds to the second signal S2 (e.g., in the debugging mode), the transistor 148 may output the activated output clock signal OCLK, which is toggled to be substantially identical to the input clock signal ICLK, by passing along the input clock signal ICLK.

Figure 5:
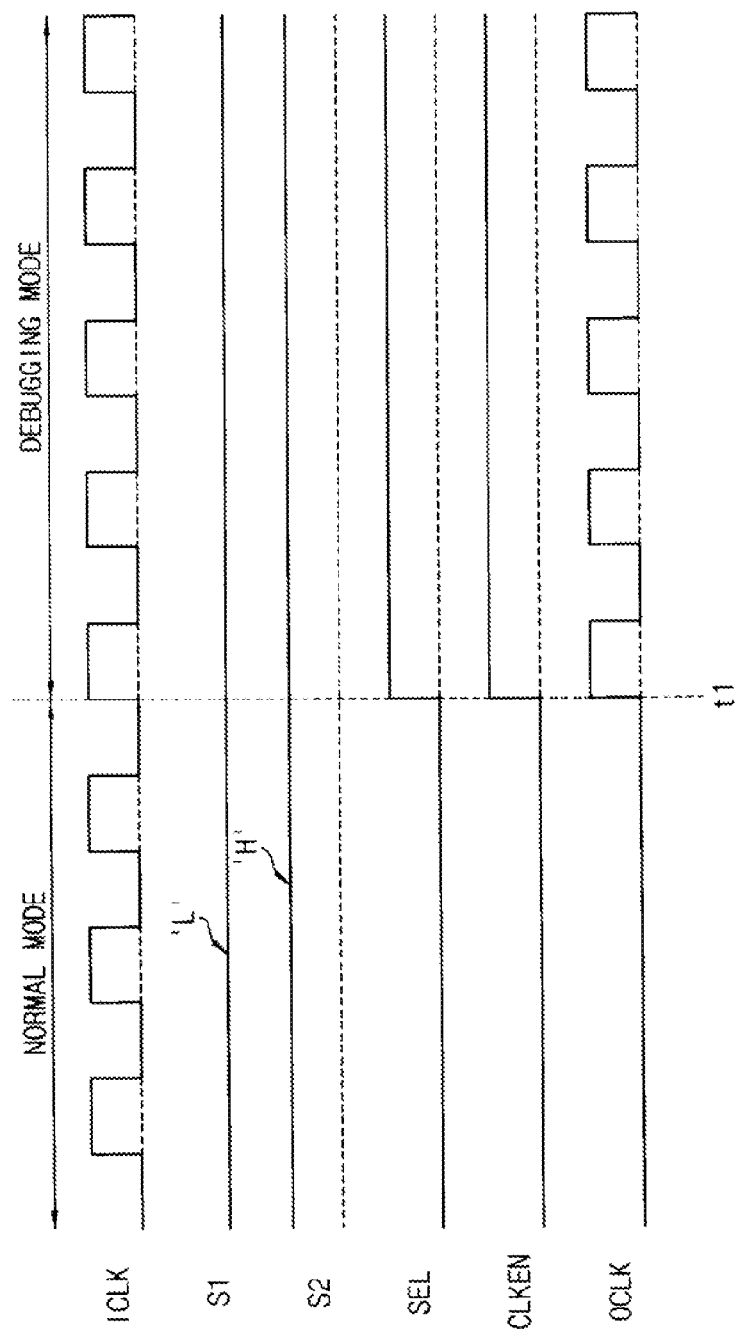
FIGS. 5 and 6 are diagrams illustrating the operation of an integrated circuit as shown in FIG. 1.
Figure 6:
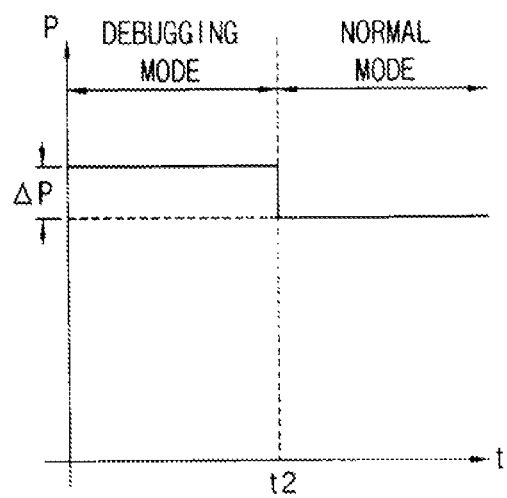

FIGS. 5 and 6 are diagrams illustrating the operation of the integrated circuit in FIG. 1. FIG. 5 is a timing diagram representing the operation of the integrated circuit 100 according to the operation mode. FIG. 6 is a graph representing power consumption of the integrated circuit 100 according to the operation mode.

Referring to FIGS. 1, 2 and 5, before time t1, the integrated circuit 100 operates in the normal operating mode to execute the target software. The first signal S1 has the logic low level 'L' and the second signal S2 has the logic high level 'H'. Since the integrated circuit 100 is not electrically connected to the external debugger 200, the detection unit 142 provides the selection signal SEL having the logic low level and the selection unit 144 outputs the first signal S1 as the clock control signal CLKEN in response to the selection signal SEL. The clock gating unit 146 gates the input clock signal ICLK in response to the clock control signal CLKEN, so the output clock signal OCLK has the logic low level. Since the clock is not supplied to the debugging circuit 160, the debugging circuit 160 is inactivated and the power consumption of the integrated circuit 100 can be reduced.

At time t1, the connector 220 of the external debugger 200 is inserted into the socket 180, and the integrated circuit 100 and the processor core 120 included in the integrated circuit 100 are electrically connected to the external debugger 200. After time t1, the integrated circuit 100 operates in the debugging mode to perform the debugging operation for the target software. Since the integrated circuit 100 is electrically connected to the external debugger 200, the detection unit 142 provides the selection signal SEL having the logic high level and the selection unit 144 outputs the second signal S2 as the clock control signal CLKEN in response to the selection signal SEL. The clock gating unit 146 passes the input clock signal ICLK in response to the clock control signal CLKEN, so the output clock signal OCLK may be substantially identical to the input clock signal ICLK. For example, the clock is supplied to the debugging circuit 160, and the debugging circuit 160 provides information IDBG with respect to the debugging operation for the target software to the external debugger 200 based on the output clock signal OCLK. The integrated circuit 100 can perform the debugging operation by using the debugging circuit 160 and the external debugger 200.

Referring to FIGS. 1 and 6, the integrated circuit 100 operates in the debugging mode before time t2 and operates in the normal operating mode after time t2. The power consumption in the normal operating mode may be less then the power consumption in the debugging mode by about ΔP. For example, ΔP may be in the range of about 5 mW to about 10 mW. For example, the integrated circuit 100 may reduce the power consumption by about 5 mW to about 10 mW through the clock gating operation for the debugging circuit 160.

Figure 7:
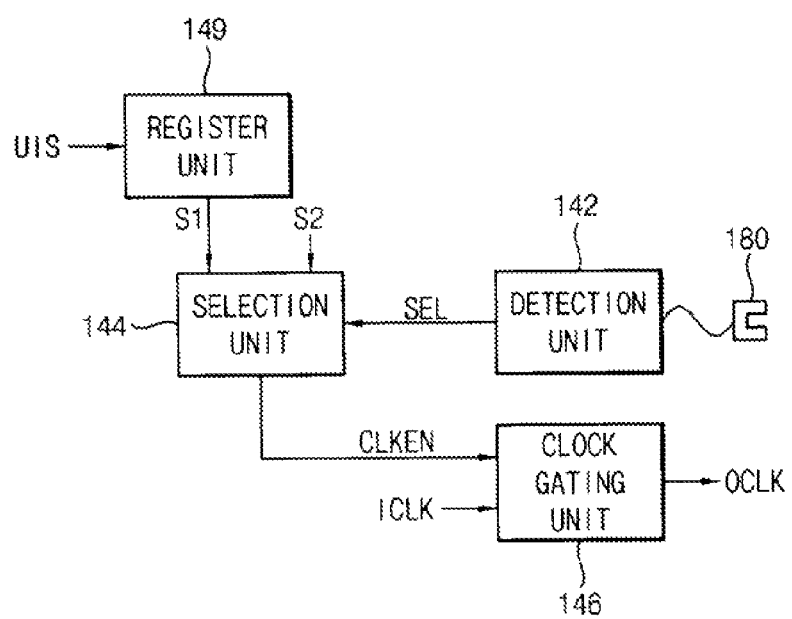
FIG. 7 is a block diagram illustrating an example of a clock control circuit included in an integrated circuit as shown in FIG. 1.

FIG. 7 is a block diagram illustrating an example of the clock control circuit included in the integrated circuit shown in FIG. 1.

Referring to FIGS. 1 and 7, the clock control circuit 140b may include a detection unit 142, a selection unit 144, a clock gating unit 146 and a register unit 149.

The detection unit 142, the selection unit 144, and the clock gating unit 146 are substantially identical to the detection unit 142, the selection unit 144, and the clock gating unit 146 included in the clock control circuit 140a in FIG. 2, respectively, so detailed description thereof will be omitted.

The register unit 149 may set the first signal S1 based on a user-provided input signal UIS including the user-provided setting value. According to the clock control circuit 140a illustrated in FIG. 2, the first signal S1 has the fixed value, so the clock to be supplied to the debugging circuit 160 is always blocked (e.g., the output clock signal OCLK is always inactivated) in the normal operating mode. However, according to the clock control circuit 140b illustrated in FIG. 7, the value of the first signal S1 may be changed by the user-provided setting (e.g., by using the software). Thus, in the normal operating mode, the clock control circuit 140b can be controlled in such a manner that the clock can be selectively applied to the debugging circuit 160 or blocked (e.g., the output clock signal OCLK can be selectively activated or inactivated).

Figure 8:
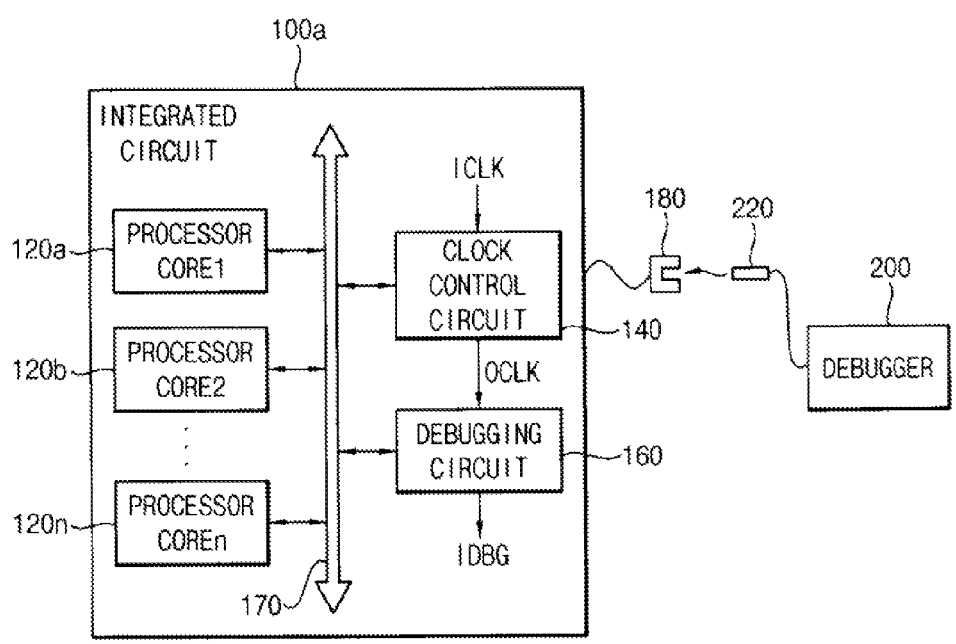
FIGS. 8 and 9 are block diagrams illustrating integrated circuits according to exemplary embodiments of the present invention.
Figure 9:
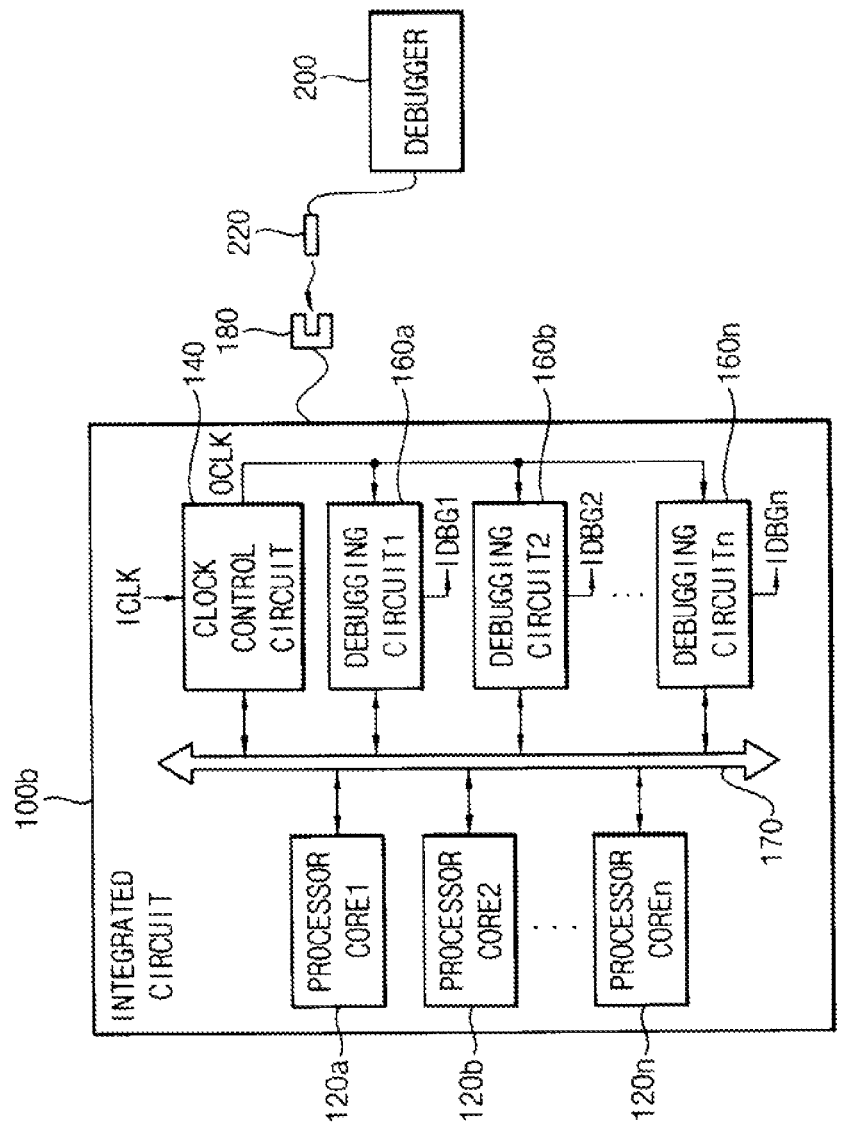

FIGS. 8 and 9 are block diagrams illustrating integrated circuits according to exemplary embodiments of the present invention.

Referring to FIG. 8, the integrated circuit 100a includes a plurality of processor cores 120a, 120b, ..., and 120n, a clock control circuit 140, a debugging circuit 160 and an internal bus 170.

The integrated circuit 100a illustrated in FIG. 8 is substantially identical to the integrated circuit 100 illustrated in FIG. 1 except that the integrated circuit 100a includes plural processor cores 120a, 120b, ..., and 120n instead of one processor core. The clock control circuit 140 determines an electrical connection state between the processor cores 120a, 120b, ..., and 120n and the external debugger 200 to generate a determination result. The clock control circuit 140 generates the output clock signal OCLK, which is selectively activated, based on the determination result and the input clock signal ICLK. The debugging circuit 160 provides information IDBG with respect to the debugging operation for the target software to the external debugger 200 based on the output clock signal OCLK.

Each of the processor cores 120a, 120b, ..., and 120n may process a plurality of instructions and data, which may collectively be referred to as the target software. For example, the integrated circuit may be an ARM core processor. The ARM core processor may be implemented in the form of a single core when the ARM core processor operates by using a system clock less than about 1 GHz, and can be implemented in the form of a multi-core when the ARM core is the next-generation ARM processor operating at a relatively high speed by using a system clock of about 1 GHz or above. In addition, the next-generation ARM processor may communicate with peripheral devices, for example, through an AXI (Advanced eXtensible Interface) bus.

Referring to FIG. 9, the integrated circuit 100b includes a plurality of processor cores 120a, 120b, . . . , and 120n, a clock control circuit 140, a plurality of debugging circuits 160a, 160b, . . . , and 160n and an internal bus 170.

The integrated circuit 100b illustrated in FIG. 9 is substantially identical to the integrated circuit 100 illustrated in FIG. 1 except that the integrated circuit 100b includes the plurality of processor cores 120a, 120b, . . . , and 120n and the plurality of debugging circuits 160a, 160b, . . . , and 160n. The clock control circuit 140 determines the electrical connection state between the processor cores 120a, 120b, . . . , and 120n and the external debugger 200 and generates the output clock signal OCLK, which is selectively activated, based on the determination result and the input clock signal ICLK.

Each of the processor cores 120a, 120b, . . . , and 120n may process a plurality of instructions and data, which together may be referred to herein as the target software. Each of the debugging circuits 160a, 160b, . . . , and 160n may provide information IDBG1, IDBG2, . . . , and IDBGn with respect to the debugging operation for the target software to the external debugger 200 based on the output clock signal OCLK. One of the debugging circuits 160a, 160b, . . . , and 160n may correspond to one of the processor cores 120a, 120b, . . . , and 120n. For example, the first debugging circuit 160a corresponds to the first processor core 120a and provides the information IDBG1 with respect to the debugging operation of the first processor core 120a for the target software to the external debugger 200 based on the output clock signal OCLK when the first processor core 120a performs the debugging operation.

Figure 10:
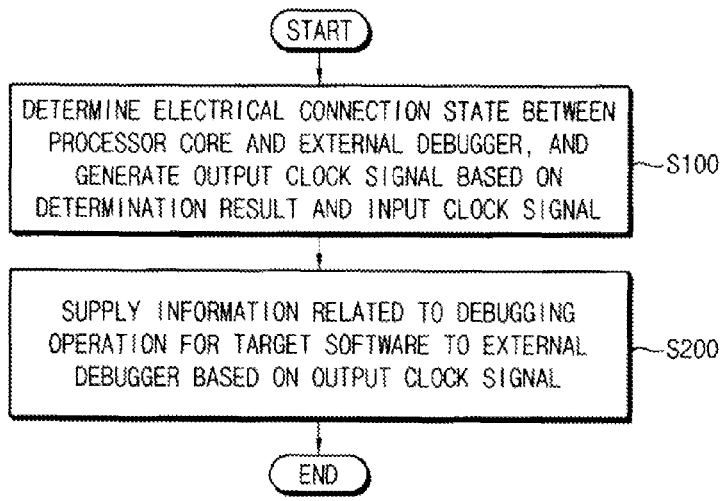
FIG. 10 is a flowchart illustrating a method of operating an integrated circuit according to exemplary embodiments of the present invention.

FIG. 10 is a flowchart illustrating a method of operating the integrated circuit according to exemplary embodiments of the present invention.

Referring to FIGS. 1 and 10, the clock control signal 140 determines the electrical connection state between the processor core 120 and the external debugger 200 and generates the output clock signal OCLK, which is selectively activated, based on the determination result and the input clock signal ICLK (step S100). The debugging circuit 160 supplies the information related to the debugging operation for the target software to the external debugger 200 based on the output clock signal OCLK (step S200). For example, when the output clock signal OCLK is activated, the debugging circuit 160 can supply the information IDBG related to the debugging operation to the external debugger 200.

Figure 11:
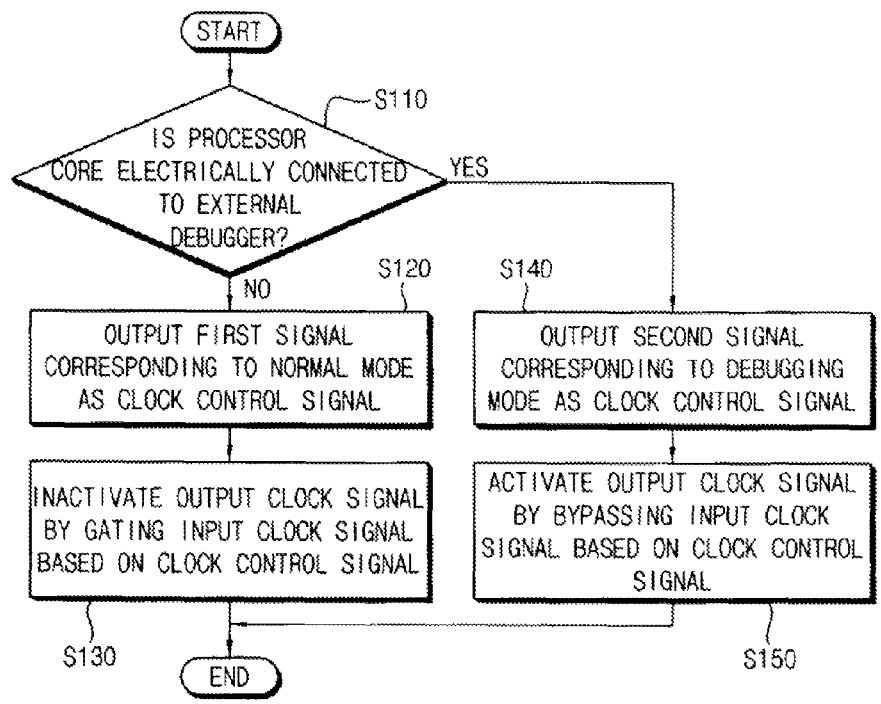
FIG. 11 is a flowchart illustrating an example of selective activation of a debugging circuit clock signal in accordance with exemplary embodiments of the present invention.

FIG. 11 is a flowchart illustrating generation of an output clock signal in accordance with exemplary embodiments of the present invention.

Referring to FIGS. 1, 2, 10 and 11, in step S100, the detection unit 142 may detect whether the processor core 120 is electrically connected to the external debugger 200 to generate the selection signal SEL (step S110).

If the processor core 120 is not electrically connected to the external debugger 200, the selection unit 144 may output the first signal S1 corresponding to the normal operating mode as the clock control signal CLKEN based on the selection signal SEL (step S120). In addition, the clock gating unit 146 may inactivate the output clock signal OCLK by gating the input clock signal ICLK based on the clock control signal CLKEN (step S130). In this case, the integrated circuit 100 may operate in the normal operating mode to execute the target software so that the power consumption of the integrated circuit 100 can be reduced.

If the processor core 120 is electrically connected to the external debugger 200, e.g., when the connector 220 electrically connected to the external debugger 200 is inserted into the socket 180 electrically connected to the integrated circuit 100, the selection unit 144 may output the second signal S2 corresponding to the debugging mode as the clock control signal CLKEN based on the selection signal SEL (step S140). In addition, the clock gating unit 146 may activate the output clock signal OCLK by passing along the input clock signal ICLK based on the clock control signal CLKEN (step S150). The integrated circuit 100 may operate in the debugging mode for performing the debugging operation for the target software.

Figure 12:
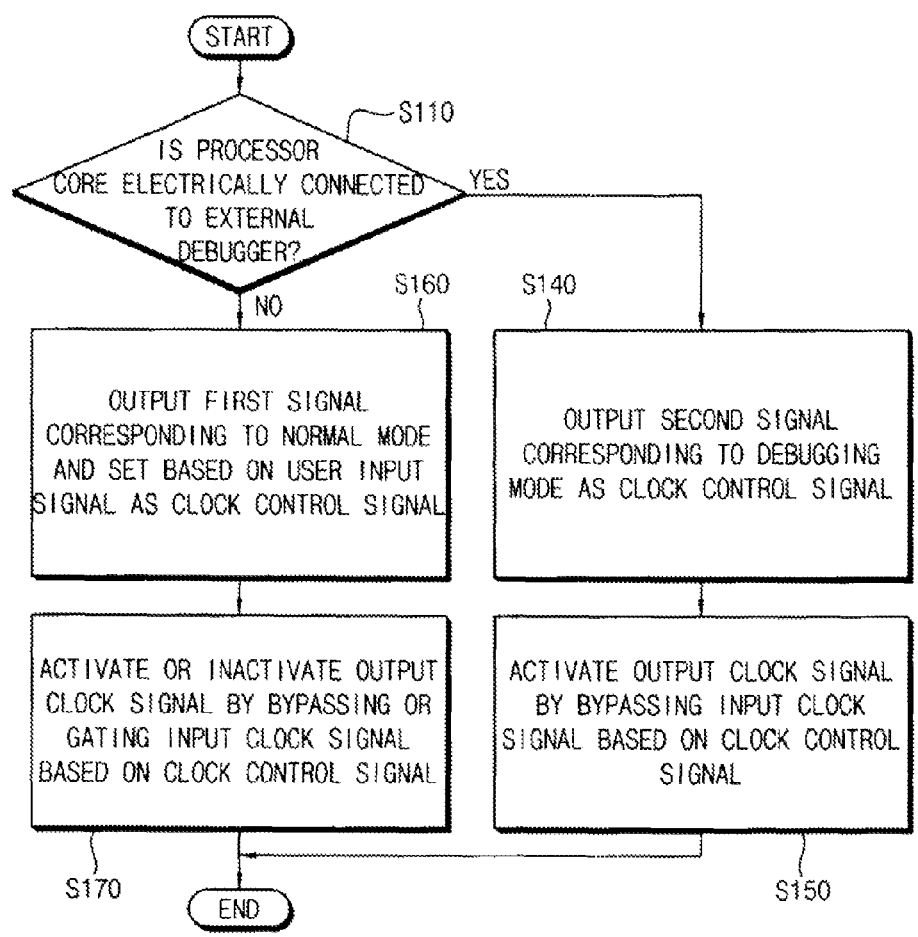
FIG. 12 is a flowchart illustrating another example of selective activation of a debugging circuit clock signal in accordance with exemplary embodiments of the present invention.

FIG. 12 is a flowchart illustrating generation of an output clock signal in accordance with exemplary embodiments of the present invention.

Referring to FIGS. 1, 7, 10 and 12, in step S100, the detection unit 142 may detect whether the processor core 120 is electrically connected to the external debugger 200 to generate the selection signal SEL (step S110).

If the processor core 120 is not electrically connected to the external debugger 200, the selection unit 144 may output the first signal S1, which corresponds to the normal operating mode. The first signal S1 is set by the register unit 149 based on the user-provided input signal UIS, as the clock control signal CLKEN based on the selection signal SEL (step S160). In addition, the clock gating unit 146 may inactivate the output clock signal OCLK by gating the input clock signal ICLK based on the clock control signal CLKEN or may activate the output clock signal OCLK by passing along the input clock signal ICLK based on the clock control signal CLKEN (step S170). In the normal operating mode, the clock can be selectively applied to the debugging circuit 160 or the clock applied to the debugging circuit 160 can be blocked according the user's setting.

If the processor core 120 is electrically connected to the external debugger 200, the selection unit 144 may output the second signal S2 corresponding to the debugging mode as the clock control signal CLKEN based on the selection signal SEL (step S140). In addition, the clock gating unit 146 may activate the output clock signal OCLK by passing along the input clock signal ICLK based on the clock control signal CLKEN (step S150). In the debugging mode, the clock may be always applied to the debugging circuit 160 regardless of the user's setting.

Figure 13:
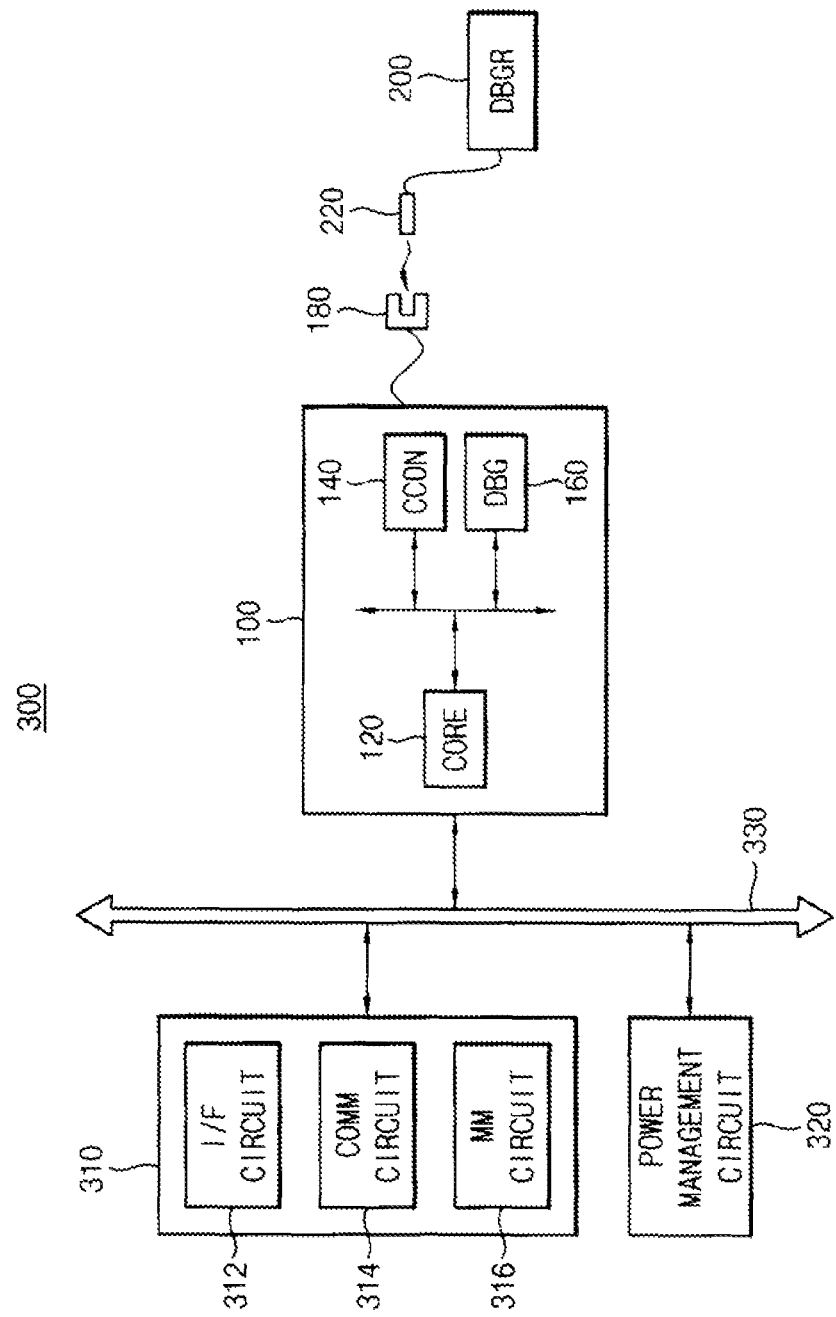
FIG. 13 is a block diagram illustrating a system-on-chip including an integrated circuit according to exemplary embodiments of the present invention.

FIG. 13 is a block diagram illustrating a system-on-chip (SoC) including the integrated circuit according to exemplary embodiments of the present invention.

Referring to FIG. 13, the system-on-chip 300 includes a plurality of functional circuits 310, an integrated circuit 100 and a power management circuit 320. The functional circuits 310, the integrated circuit 100 and the power management circuit 320 are electrically connected with each other through a system bus 330 to perform signal communication with each other. The system-on-chip 300 may be an Application-Specific Integrated Circuit (ASIC), a mobile SoC, a multimedia SoC, a smart card, or the like.

The functional circuits 310 may perform various functions in the system-on-chip 300 and may include at least one of an interface circuit 312 that communicates signals with external apparatuses (not shown), a communication circuit 314 that performs wired/wireless communication functions, and a multimedia circuit 316 that processes various media, such as images and sounds, by using multimedia apparatuses (not shown).

The integrated circuit 100 drives at least one of the functional circuits 310 by executing the target software. The integrated circuit 100 may be structured as illustrated in FIG. 1. In detail, the integrated circuit 100 may be an application processor (AP), a microprocessor, a central processing unit (CPU), or the like. The integrated circuit 100 includes the processor core 120 that processes a plurality of instructions and data, which together may constitute target software. The integrated circuit 100 also includes the clock control circuit 140 that determines the electrical connection state between the processor core 120 and the external debugger 200 and generates the output clock signal OCLK, which is selectively activated, based on the determination result and the input clock signal ICLK. The integrated circuit 100 also includes the debugging circuit 160 that supplies the information IDBG related to the debugging operation for the target software to the external debugger 200 based on the output clock signal OCLK. The integrated circuit 100 selectively applies clocks to the debugging circuit 160 or blocks the clocks according to the electrical connection state between the processor core 120 and the external debugger 200, so the power consumption of the system-on-chip 300 can be reduced in the normal operating mode and the debugging operation for the target software can be effectively performed in the debugging mode. According to exemplary embodiments of the present invention, the integrated circuit 100 may include a plurality of processor cores, as shown in FIG. 8, or a plurality of processor cores and debugging circuits, as shown in FIG. 9.

The power management circuit 320 provides a power supply voltage to the functional circuits 310 and the integrated circuit 100. According to exemplary embodiments, the integrated circuit 100 and the functional circuits 310 may be included in mutually exclusive power domains, respectively. The power management circuit 320 can effectively manage the power of the system-on-chip based on various schemes, such as a dynamic voltage/frequency scaling (DVFS) scheme, which changes operating voltage and/or operating frequency of each power domain during the operation of the system, or based on a fuse scheme, which selectively activates each power domain or the functional circuits corresponding to the power domain by using a fuse, such as an E-fuse.

According to exemplary embodiment, the system-on-chip 300 may further include a socket 180 for the purpose of electric connection with the external debugger 200. For example, when the connector 220 electrically connected to the external debugger 200 is fitted into the socket 180 electrically connected to the integrated circuit 100, the system-on-chip 300 may be electrically connected to the external debugger 200.

Figure 14:
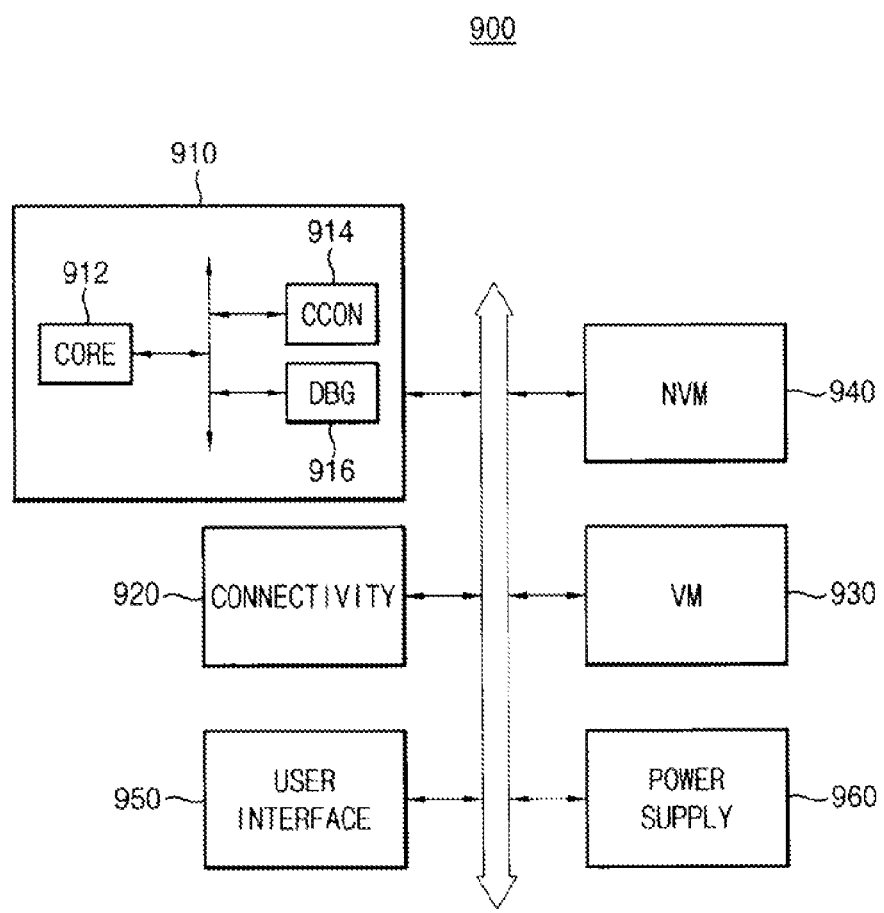
FIG. 14 is a block diagram illustrating a mobile system including an integrated circuit according to exemplary embodiments of the present invention.

FIG. 14 is a block diagram illustrating a mobile system including the integrated circuit according to exemplary embodiments of the present invention.

Referring to FIG. 14, a mobile system 900 includes an integrated circuit 910, a connectivity unit 920, a volatile memory device 930, a nonvolatile memory device 940, a user interface 950 and a power supply 960. According to exemplary embodiments, the mobile system 900 may be any mobile system, such as a mobile phone, a smart phone, a tablet computer, a laptop computer, a personal digital assistant (PDA), a personal media player (PMP), a digital camera, a portable game console, a music player, a camcorder, a video player, a navigation system, etc.

The integrated circuit 910 may execute applications, such as an internet browser, a game application, a video player application, etc. For example, the integrated circuit 910 may be an application processor (AP) and may include a processor core 912, a clock control circuit 914 and a debugging circuit 916. The integrated circuit 910 selectively applies clocks to the debugging circuit 916 or blocks the clocks according to the electrical connection state between the processor core 912 and the external debugger (not shown), so the power consumption of the mobile system 900 can be reduced in the normal operating mode and the debugging operation for the target software can be effectively performed in the debugging mode. In some exemplary embodiments, the integrated circuit 910 may further include a cache memory (not shown) located inside or outside the integrated circuit 910.

The connectivity unit 920 may perform wired or wireless communication with an external device. For example, the connectivity unit 920 may manage a USB communication, an Ethernet communication, a near field communication (NFC), a radio frequency identification (RFID) communication, a mobile telecommunication, a memory card communication, wireless internet, a Wi-Fi connection, such as IEEE 801.11n, global positioning system (GPS), Bluetooth (BT), global system for mobile communication (GSM), general packet radio system (GPRS), wideband code division multiple access (WCDMA), high speed uplink/downlink packet access (HSxPA), Long Term Evolution (LTE), etc. The connectivity unit 920 may include a baseband chipset.

The volatile memory device 930 may store an instruction/data processed by the processor core 912, or may serve as a working memory. For example, the volatile memory device 930 may be implemented by a DRAM, a SRAM, a mobile DRAM, or the like.

The nonvolatile memory device 940 may store a boot image for booting the mobile system 900. For example, the nonvolatile memory device 940 may be implemented by an electrically erasable programmable read-only memory (EEPROM), a flash memory, a PRAM, a RRAM, a MRAM, a FRAM, a nano floating gate memory (NFGM), a polymer random access memory (PoRAM), or the like.

The user interface 950 may include at least one input device, such as a keypad, a touch screen, etc., and at least one output device, such as a display device, a speaker, etc. The power supply 960 may supply the mobile system 900 with power. In some exemplary embodiments, the mobile system 900 may further include a camera image processor (CIS), storage device, such as a memory card, a SDD, a CD-ROM, etc.

According to exemplary embodiments, the mobile system 900 and/or components of the mobile system may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

Figure 15:
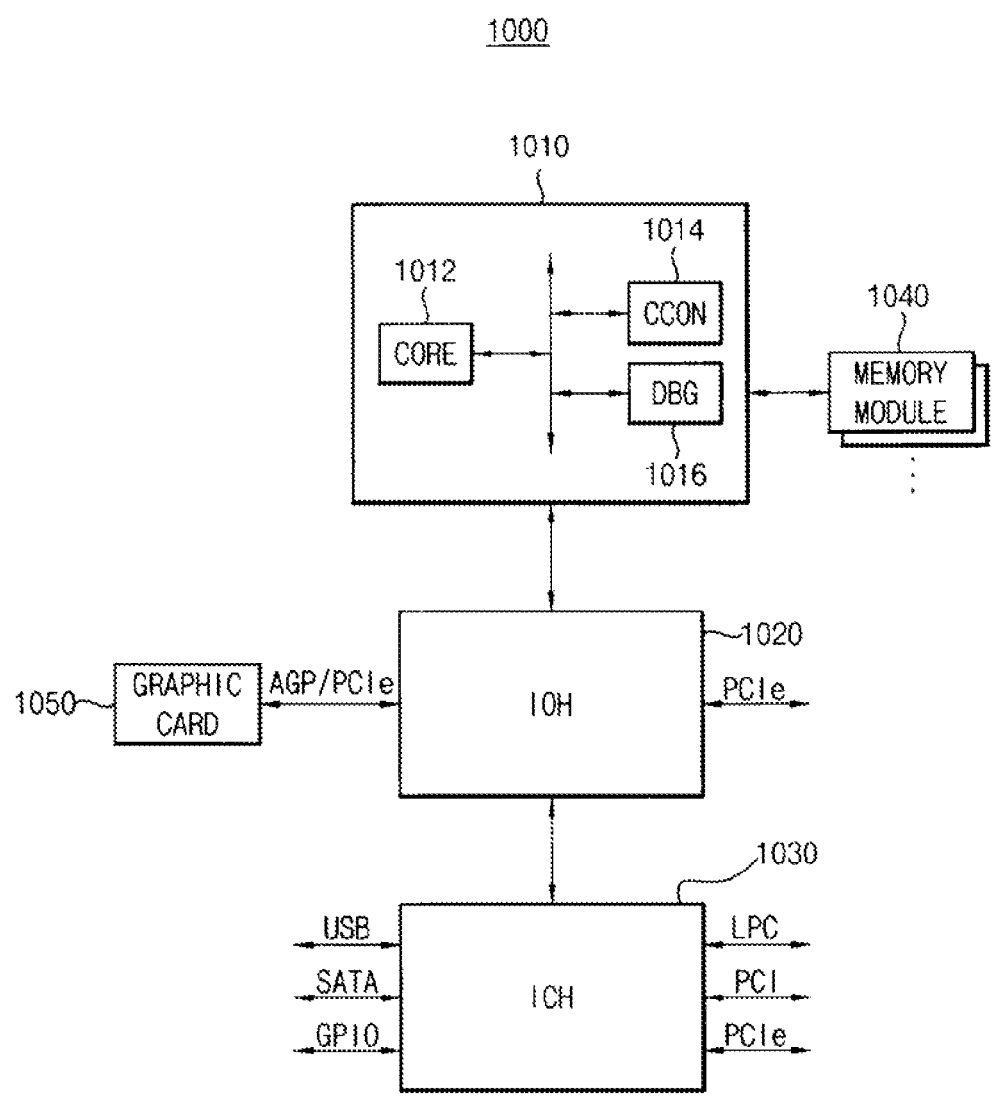
FIG. 15 is a block diagram illustrating a computing system including an integrated circuit according to exemplary embodiments of the present invention.

FIG. 15 is a block diagram illustrating a computing system including the integrated circuit according to exemplary embodiments of the present invention.

Referring to FIG. 15, a computing system 1000 includes an integrated circuit 1010, an I/O hub 1020, an I/O controller hub 1030, at least one memory module 1040 and a graphic card 1050. According to exemplary embodiments, the computing system 1000 may be any computing system, such as a personal computer (PC), a server computer, a workstation, a tablet computer, a laptop computer, a mobile phone, a smart phone, a PDA, a PMP, a digital camera, a digital television, a set-top box, a music player, a portable game console, a navigation device, etc.

The integrated circuit 1010 may perform specific calculations or tasks. For example, the integrated circuit 1010 may be a microprocessor, a central process unit (CPU), a digital signal processor, or the like, and may include a processor core 1012, a clock control circuit 1014 and a debugging circuit 1016. The integrated circuit 1010 selectively applies clocks to the debugging circuit 1016 or blocks the clocks according to the electrical connection state between the processor core 1012 and the external debugger (not shown), so the power consumption of the computing system 1000 can be reduced in the normal operating mode and the debugging operation for the target software can be effectively performed in the debugging mode.

According to exemplary embodiments, the integrated circuit 1010 may include a single processor core or a plurality of processor cores. For example, the integrated circuit 1010 may be a multi-core processor, such as a dual-core processor, a quad-core processor, a hexa-core processor, etc. Although FIG. 15 illustrates an example of the computing system 1000 including one integrated circuit 1010, according to exemplary embodiments, the computing system 1000 may include a plurality of integrated circuits.

The integrated circuit 1010 may include a memory controller (not illustrated) that controls an operation of the memory module 1040. The memory controller included in the integrated circuit 1010 may be referred to as an integrated memory controller (IMC). A memory interface between the memory controller and the memory module 1040 may be implemented by one channel including a plurality of signal lines, or by a plurality of channels. Each channel may be coupled to at least one memory module 1040. In some exemplary embodiments, the memory controller may be included in the I/O hub 1020. The I/O hub 1020 including the memory controller may be referred to as a memory controller hub (MCH).

The I/O hub 1020 may manage data transfer between the integrated circuit 1010 and devices, such as the graphic card 1050. The I/O hub 1020 may be coupled to the integrated circuit 1010 via at least one of various interfaces, such as a front side bus (FSB), a system bus, a HyperTransport, a lightning data transport (LDT), a QuickPath interconnect (QPI), a common system interface (CSI), etc. Although FIG. 15 illustrates an example of the computing system 1000 including one I/O hub 1020, according to exemplary embodiments, the computing system 1000 may include a plurality of I/O hubs.

The I/O hub 1020 may provide various interfaces with the devices. For example, the I/O hub 1020 may provide an accelerated graphics port (AGP) interface, a peripheral component interface-express (PCIe), a communications streaming architecture (CSA) interface, etc.

The graphic card 1050 may be coupled to the I/O hub 1020 via the AGP or the PCIe. The graphic card 1050 may control a display device (not illustrated) for displaying an image. The graphic card 1050 may include an internal processor and an internal memory to process the image. In some exemplary embodiments, the input/output hub 1020 may include an internal graphic device along with or instead of the graphic card 1050. The internal graphic device may be referred to as an integrated graphics processor, and an I/O hub including the memory controller and the internal graphic device may be referred to as a graphics and memory controller hub (GMCH).

The I/O controller hub 1030 may perform data buffering and interface arbitration to efficiently operate various system interfaces. The I/O controller hub 1030 may be coupled to the I/O hub 1020 via an internal bus. For example, the I/O controller hub 1030 may be coupled to the I/O hub 1020 via at least one of various interfaces, such as a direct media interface (DMI), a hub interface, an enterprise Southbridge interface (ESI), PCIe, etc.

The I/O controller hub 1030 may provide various interfaces with peripheral devices. For example, the I/O controller hub 1030 may provide a universal serial bus (USB) port, a serial advanced technology attachment (SATA) port, a general purpose input/output (GPIO), a low pin count (LPC) bus, a serial peripheral interface (SPI), a PCI, a PCIe, etc.

In some exemplary embodiments, the integrated circuit 1010, the I/O hub 1020 and the I/O controller hub 1030 may be implemented as separate chipsets or separate integrated circuits. In some exemplary embodiments, at least two of the integrated circuit 1010, the I/O hub 1020 and the I/O controller hub 1030 may be implemented as one chipset.

Exemplary embodiments of the present invention may be applied to a mobile system or a computing system including an integrated circuit having a debugging circuit. For example, the exemplary embodiments can be applied to a cellular phone, a smart phone, a personal digital assistant, a portable multimedia player, a digital camera, a personal computer, a server computer, a workstation, a notebook computer, a digital TV, a set-top box, a music player, a portable game console, a navigation system and the like.

The foregoing is illustrative of exemplary embodiments and is not to be construed as limiting the present inventive concept. Although a few exemplary embodiments have been described, those skilled in the art will readily appreciate that many modifications may be applied to the exemplary embodiments discussed herein without materially departing from the present inventive concept. Accordingly, all such modifications are intended to be included within the scope of the present inventive concept as defined in the claims.

What is claimed is:

1. An integrated circuit, comprising:
   at least one processor core configured to process target software comprising a plurality of instructions and data;
   a clock control circuit configured to determine when an no electrical connection exists between the processor core and an external debugger, that is external to the integrated circuit, and to generate a determination result therefrom, the clock control circuit further configured to generate an output clock signal based on the determination result and an input clock signal, the external debugger performing a debugging operation for the target software, the output clock signal being selectively activated based on the determination result and the input clock signal; and
   an internal debugging circuit, internal to the integrated circuit, configured to provide information with respect to the debugging operation for the target software to the external debugger based on the output clock signal,
   wherein the clock control circuit is additionally configured to block a clock signal applied to the internal debugging circuit to reduce power consumption of the integrated circuit when it is determined that no electrical connection exists between the processor core and an external debugger.

2. The integrated circuit of claim 1, wherein the clock control circuit activates the output clock signal by passing along the input clock signal when the processor core is electrically connected to the external debugger, and wherein the clock control circuit inactivates the output clock signal by gating the input clock signal when the processor core is not electrically connected to the external debugger.

3. The integrated circuit of claim 1, wherein the clock control circuit activates the output clock signal by passing along the input clock signal when the processor core is electrically connected to the external debugger, and wherein the clock control circuit activates the output clock signal by passing along the input clock signal based on a user-provided setting value or inactivates the output clock signal by gating the input clock signal when the processor core is not electrically connected to the external debugger.

4. The integrated circuit of claim 1, wherein the clock control circuit includes:
   a detection unit configured to generate a selection signal by detecting if the electrical connection exists between the processor core and the external debugger;
   a selection unit configured to output a first signal or a second signal as a clock control signal based on the selection signal, the first signal corresponding to a normal operating mode, the second signal corresponding to a debugging mode; and
   a clock gating unit configured to generate the output clock signal by gating or passing along the input clock signal based on the clock control signal.

5. The integrated circuit of claim 4, wherein the integrated circuit operates in the normal operating mode when the processor core is not electrically connected to the external debugger, and wherein the integrated circuit operates in the debugging mode when the processor core is electrically connected to the external debugger.

6. The integrated circuit of claim 5, wherein the selection unit outputs the first signal as the clock control signal in the normal operating mode and outputs the second signal as the clock control signal in the debugging mode, wherein the clock gating unit gates or passes the input clock signal in the normal operating mode to generate the output clock signal and passes the input clock signal in the debugging mode to generate the output clock signal.

7. The integrated circuit of claim 4, wherein the selection unit includes a multiplexer, and wherein the multiplexer includes:
   a first input terminal receiving the first signal;
   a second input terminal receiving the second signal;
   a selection terminal receiving the selection signal; and
   an output terminal selectively outputting the first signal or the second signal as the clock control signal in response to the selection signal.

8. The integrated circuit of claim 4, wherein the clock gating unit includes a logic gate, and wherein the logic gate includes:
   a first input terminal receiving the input clock signal;
   a second input terminal receiving the clock control signal; and
   an output terminal outputting the output clock signal by performing a logic operation on the input clock signal and the clock control signal.

9. The integrated circuit of claim 4, wherein the clock gating unit includes a transistor, and wherein the transistor includes:
   a first electrode receiving the input clock signal;
   a control electrode receiving the clock control signal; and
   a second electrode outputting the output clock signal in response to the clock control signal.

10. The integrated circuit of claim 4, wherein the clock control circuit further includes a register unit that sets the first signal based on a user-provided input signal.

11. The integrated circuit of claim 1, wherein the integrated circuit includes an application processor (AP), a microprocessor or a central processing unit (CPU).

12. A system-on-chip, comprising:
   a plurality of functional circuits;
   an integrated circuit configured to drive at least one of the plurality of functional circuits by executing target software; and
   a power management circuit configured to provide a power supply voltage to each of the plurality of functional circuits and the integrated circuit,
   wherein the integrated circuit, comprising:
      at least one processor core configured to process a plurality of instructions and data of the target software;
      a clock control circuit configured to determine if no electrical connection exists between the system-on-chip and an external debugger, that is external to the integrated circuit, to generate a determination result therefrom, the clock control circuit further configured to generate an output clock signal based on the determination result and an input clock signal, the external debugger performing a debugging operation for the target software, the output clock signal being selectively activated based on the determination result and the input clock signal; and
      an internal debugging circuit, internal to the integrated circuit, configured to provide information with respect to the debugging operation for the target software to the external debugger based on the output clock signal,
      wherein the clock control circuit is additionally configured to block a clock signal applied to the internal debugging circuit to reduce power consumption of the integrated circuit when it is determined that no electrical connection exists between the system-on-chip and an external debugger.

13. The system-on-chip of claim 12, further comprising: a socket for facilitating an electric connection with the external debugger.

14. The system-on-chip of claim 12, wherein the integrated circuit and the plurality of functional circuits are included in mutually exclusive power domains.

15. The system-on-chip of claim 12, wherein the plurality of functional circuits include an interface circuit, a communication circuit, or a multimedia circuit.

16. An integrated circuit, comprising:
   at least one processor core configured to process target software when the integrated circuit is in an operating mode;
   an internal debugger circuit, internal to the integrated circuit, configured to facilitate debugging of the target software when the integrated circuit is in a debugging mode; and
   a clock control circuit configured to determine whether no electrical connection exists between the integrated circuit and the external debugger, to provide the internal debugger circuit with a clock signal when it is determined that the electrical connection exists, and to prevent the internal debugger circuit from receiving the clock signal when it is determined that the electrical connection does not exist to reduce power consumption of the integrated circuit.

17. The integrated circuit of claim 16, wherein providing the internal debugger circuit with the clock signal includes: receiving an input clock signal; and sending the input clock signal to the internal debugger circuit when it is determined that the electrical connection exists.

18. The integrated circuit of claim 16, wherein preventing the internal debugger circuit from receiving the clock signal includes:
- receiving an input clock signal; and
- refraining from sending the input clock signal to the internal debugger circuit when it is determined that the electrical connection does not exist.

19. The integrated circuit of claim 16, wherein the internal debugging circuit is configured to provide information with respect to a debugging operation of the target software to the external debugger when the integrated circuit is in the debugging mode and the internal debugger circuit is provided with the clock signal.

20. The integrated circuit of claim 16, wherein the clock control circuit generates a clock control signal indicative of whether the electrical connection exists and the clock control signal is used provide the internal debugger circuit with the clock signal when it is determined that the electrical connection exists and to prevent the internal debugger circuit from receiving the clock signal when it is determined that the electrical connection does not exist.

* * * * *